United States Patent [19]

Schaefer

[11] 4,215,471

[45] Aug. 5, 1980

[54] FRUIT KNIFE

[76] Inventor: Hans-Joachim Schaefer, Gymnasiumstrasse 7, D-6380 Bad Homburg, Fed. Rep. of Germany

[21] Appl. No.: 918,363

[22] Filed: Jun. 23, 1978

[51] Int. Cl.² .......................... B26B 9/02; A47J 17/04
[52] U.S. Cl. ...................................... 30/147; 30/351; 30/356
[58] Field of Search ..................... 30/149, 123.5, 123.6, 30/355, 356, 150, 351, 147, 148, 142

[56] References Cited

U.S. PATENT DOCUMENTS

| | | | |
|---|---|---|---|
| D. 56,013 | 8/1920 | Lickert | 30/356 X |
| 2,338,007 | 12/1943 | Morris | 30/355 X |
| 2,455,623 | 12/1948 | Stone | 30/142 X |
| 3,086,286 | 4/1963 | Faller | 30/356 X |
| 3,121,951 | 2/1964 | Green | 30/149 |

FOREIGN PATENT DOCUMENTS 657019  9/1951  United Kingdom ...................... 30/355

*Primary Examiner*—Jimmy C. Peters
*Attorney, Agent, or Firm*—Michael J. Striker

[57] ABSTRACT

A fruit knife has a handle, and a blade connected with the handle and having a plurality of throughgoing apertures. This permits the juice produced during movement of the blade through the fruit to flow through the apertures and thereby prevents spurting of the juice. The apertures may be spaced from one another in the direction of elongation of the elongated blade and uniformly distributed on the latter. The apertures may be arranged in rows spaced from one another in a direction transverse to the direction of elongation of the blade. The apertures of one row may be offset relative to the apertures of the adjacent row in the direction of elongation of the blade. The blade may have forked end. An intermediate spoon-like portion may be provided between the forked end and the remainder of the knife blade.

22 Claims, 4 Drawing Figures

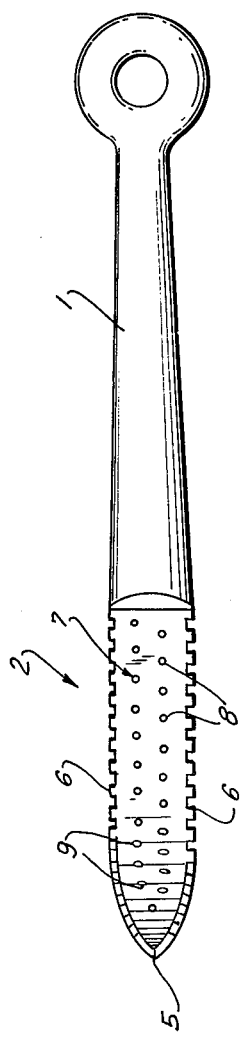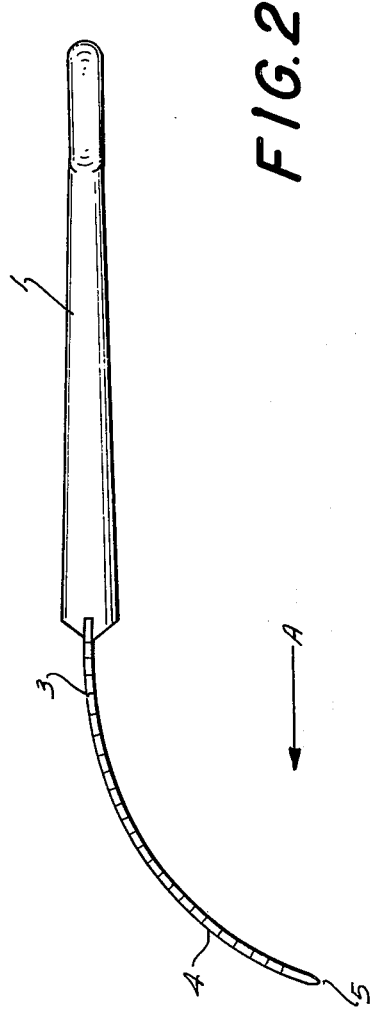

FRUIT KNIFE

BACKGROUND OF THE INVENTION

The present invention relates to a fruit knife having a handle and a blade.

Fruit knives have been proposed in the art, having handles and blades connected to the handles. Such fruit knives are used for instance, for preparing for human consumption citrus, orange, grapefruits and the like, by separating their peel from their flesh or by cutting the flesh of the fruits. In the known knives the blades are formed as substantially solid members. This has the following disadvantages. The juice produced during movement of the knife through the fruit has a tendency to spurt out of the fruit. In this case, the thus-spurted juice is lost for consumption and, moreover, contaminates the user. In order to avoid substantial spurting of the juice the knife must be moved through the fruit very slowly; however, even in this case the juice spurts out of the fruit. The known fruit knives also do not have means for effective initial piercing of the fruit and collecting the juice produced during cutting of the fruit.

SUMMARY OF THE INVENTION

Accordingly, it is an object of the present invention to provide a fruit knife which avoids the disadvantages of the prior art fruit knives.

More particularly, it is an object of the present invention to provide a fruit knife which can so cut the fruit that spurting of the juice out of the fruit is substantially reduced or eliminated, and therefore the juice is not lost and does not contaminate the consumer.

Another object of the present invention is to provide such a fruit knife enables the consumer to peel or to cut the fruit at a substantially high speed and at the same time does not produce substantial spurting of the juice of the fruit.

Still another object of the present invention is to provide a fruit knife which can effectively pierce the fruit and collect the juice produced during cutting thereof.

In keeping with these objects and with others which will become apparent hereinafter, one feature of the present invention resides, briefly stated, in a fruit knife which has a blade connected to a handle and provided with a plurality of throughgoing apertures. In such a construction, when the knife moves through the fruit, the juice produced during this movement flows through the apertures of the blade and does not spurt out of the fruit. Therefore, the juice is not lost and does not contaminate the consumer. On the other hand, the knife can move faster than the known knives and at the same time does not cause spurting of the juice out of the fruit.

Another feature of the present invention is that the apertures are spaced from one another in the direction of elongation of the blade and uniformly distributed on the latter. When the blade includes a straight portion and a curved portion connected with one another, the apertures are provided in both above portions.

Still another feature of the present invention is that the apertures may be arranged in rows spaced from one another in a direction transverse to the direction of elongation of the blade. It is advantageous when the apertures of one of the rows are offset relative to the apertures of the adjacent row in the direction of elongation of the blade. They may also be offset for a distance corresponding to half of the distance between the adjacent apertures of each of the rows. It is also possible that the adjacent apertures of each row are spaced from one another for a distance which is equal to the distance between the adjacent rows of the apertures. The rows of the apertures may be located symmetrically relative to a longitudinal axis of the blade.

A further feature of the present invention is that in the case when the blade has a pointed end portion and the transverse dimension decreasing towards the pointed end portion, the number of the rows of the apertures or the distance between the rows of the apertures may decrease in the direction towards the pointed end of the blade. For example, the main portion of the blade of the fruit knife may have two rows of the apertures, whereas the decreased portion of the blade which is adjacent to the pointed end of the latter may have one row of the apertures.

A still further feature of the present invention is that the fruit knife may have a forked end which enables the user to pierce and cut portions of the fruit without additional cutlery.

An additional feature of the invention is that the fruit knife may have an additional spoon-like portion adapted to collect the juice produced during cutting and peeling of the fruits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a top view of a fruit knife, in accordance with the present invention;

FIG. 2 is a side view of the fruit knife shown in FIG. 1;

DESCRIPTION OF THE PREFERRED EMBODIMENTS

Figure 3:
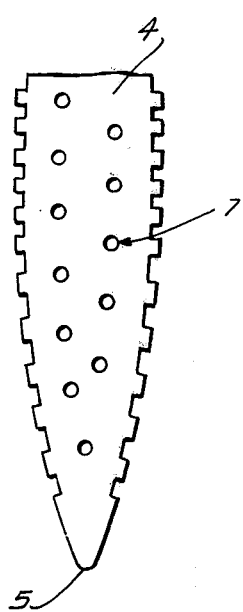
FIG. 3 is a side view taken in the direction of the arrow A and showing an end portion of a blade of a fruit knife.

As shown in the drawing, the fruit knife of the invention has an elongated handle 1 and a blade identified in toto by reference numeral 2. The blade 2 has a substantially straight portion 3 connected with the handle 1, and a curved portion 4 connected with the straight portion 3 and having a pointed end 5. The straight portion 3 of the blade 2 provides an operative space between the user's one hand operating the fruit knife and the user's other hand holding the fruit. It also performs straight cuts of the fruit. The curved portion 4 of the fruit knife provides the proper separation of the fruit peel or skin by circular movement of the fruit knife. The blade 2 has cutting edges 6 which may be saw-toothed.

In accordance with the present invention, the blade 2 of the fruit knife is provided with a plurality of apertures identified in toto by reference numeral 7. The apertures 7 are spaced from one another in the direction of elongation of the blade 2 and uniformly distributed on the latter. They may be spaced from one another for substantially equal distances. The apertures are provided both in the straight portion 3 or the blade 2 and in the curved portion 4 thereof.

As shown in FIG. 1 of the drawing, the apertures 7 are arranged in rows 8 and 9. While only two rows are shown in the drawing, it is understood that any greater number of rows may be provided in the blade 2. The apertures of the row 8 are offset relative to the apertures of the row 9 in the direction of elongation of the blade 2. Preferably, they are offset for a distance equal to half of the distance between the adjacent apertures of each row. The rows 8 and 9 of the apertures are located symmetrically relative to a longitudinal axis of the blade 2.

The curved portion 4 of the blade 2 has a width decreasing in the direction towards the pointed end 5 of the blade. As shown in FIGS. 1 and 3, the rows 8 and 9 of the apertures are spaced from one another for the distance decreasing in the direction towards the pointed end 5 and in correspondence with the decrease of the width of the curved portion 4 of the blade 2. This means that the number of rows of the apertures is also decreased in this direction. Thus, for instance, while the straight portion 3 of the blade 2 is provided with two rows 8 and 9, of the apertures 7, the region of the curved portion 4 adjacent to the pointed end 5 of the blade is provided with one row of the apertures 7.

When the fruit knive is constructed in accordance with the present invention so that its blade 2 has a plurality of apertures 7, the juice produced during movement of the knife through the fruit does not spurt out of the fruit. Therefore, the juice is preserved in the fruit and does not contaminate the consumer. On the other hand, the fruit can be cut or peeled at a substantially high speed without spurting of the juice out of the same.

Figure 4:
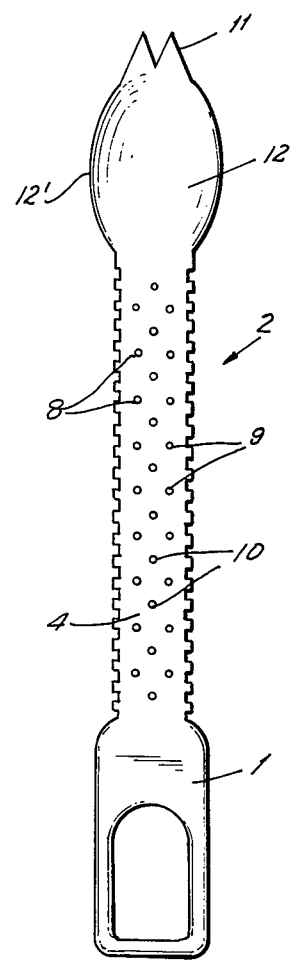
FIG. 4 is a top view of a fruit knife in accordance with another embodiment of the present invention.

FIG. 4 shows a fruit knife in accordance with a second embodiment of the present invention. The knife has three rows of apertures 8, 9 and 10. The rows 8 and 9 are located symmetrically relative to a longitudinal axis of the blade 2, whereas the row 10 coincides with the longitudinal axis. The curved portion 4 of the blade 2 does not have a width decreasing in the direction towards the end of the blade, and the rows of apertures does not approach one another in the region of the blade end, as in the knife in accordance with the first embodiment of the invention. Instead, the rows of apertures are parallel to one another over the entire length of the blade.

Unlike the pointed end 5 of the knife shown in FIG. 1, the knife in accordance with the second embodiment of the invention shown in FIG. 2 has a forked end 11. The forked end 11 enables the user to pierce and to cut portions of the fruit without additional cutlery.

An additional spoon-like portion 12 is provided between the curved portion 4 of the blade 2 and the forked end 11 of the knife. This portion 12 serves as a spoon. The curved portion 4 of the blade 2 merges into the spoon-like portion 12, whereas the latter merges into the forked end 11. The portion 12 has convex lateral sides 12' and is concave so as to form a receptacle for collecting of the fruit juice. However, the portion 12 may also be flat, or may have another shape. The spoon-like portion 12 is solid and does not have apertures. The lateral sides 12' of the portion 12 may also be provided with cutting edges.

It will be understood that each of the elements described above, or two or more together, may also find a useful application in other types of constructions differing from the types described above.

While the invention has been illustrated and described as embodied in a fruit knife, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fruit knife, comprising a handle; and an elongated blade connected with said handle and having a plurality of throughgoing apertures permitting the juice produced during movement of the blade through the fruit to flow through said apertures and thereby preventing spurting of the juice, said apertures being spaced from one another in the direction of elongation of said blade and arranged in rows which are spaced from one another in a direction substantially transverse to the direction of elongation of said blade, said blade having a substantially straight portion connected to said handle, and a substantially curved portion connected to said straight portion, said portions of said blade extending and being spaced from one another in the direction of elongation of said blade cutter.

2. The fruit knife as defined in claim 1, wherein said apertures are uniformly distributed on said blade.

3. The fruit knife as defined in claim 1 wherein said apertures are arranged both in said straight portion and in said curved portion of said blade cutter.

4. The fruit knife as defined in claim 1, wherein the apertures of one of said rows are offset relative to the apertures of the adjacent row in the direction of elongation of said blade.

5. The fruit knife as defined in claim 1, wherein said apertures are spaced from one another in the direction of elongation of said blade at substantially equal distances.

6. The fruit knife as defined in claim 1, wherein the apertures of each row are spaced from one another for a first distance, one of said rows of apertures being spaced from the adjacent row of apertures for a distance which is equal to said first distance.

7. The fruit knife as defined in claim 1, wherein said blade has a longitudinal axis extending in the direction of elongation of said blade, said rows of said apertures being located symmetrically relative to said longitudinal axis of said blade.

8. The fruit knife as defined in claim 7, wherein said blade has a further plurality of apertures arranged in a further row which extends in the direction of elongation of said blade and coincides with said longitudinal axis thereof.

9. The fruit knife as defined in claim 1, wherein said blade has a first end portion connected with said handle and a second end portion spaced from said first end portion in the direction of elongation of said blade, said first end portion having a dimension in a direction transverse to the direction of elongation of said blade which exceeds the respective dimension of said second end portion.

10. The fruit knife as defined in claim 9, wherein said first portion of said blade is provided with the number of rows of said apertures exceeding the number of rows provided on said second portion thereof.

11. The fruit knife as defined in claim 1, wherein said blade has two sides spaced from one another in a direction transverse to the direction of elongation thereof and at least one cutting edge provided on one of said sides.

12. The fruit knife as defined in claim 1, wherein said blade is elongated and has a first end portion connected with said handle, and a second end portion spaced from said first end portion in the direction of elongation of said blade and having a forked end.

13. A fruit knife, comprising a handle; and an elongated blade connected with said handle and having a plurality of throughgoing apertures permitting the juice produced during movement of the blade through the fruit to flow through said apertures and thereby preventing spurting of the juice, said apertures being spaced from one another in the direction of elongation of said blade and arranged in rows which are spaced from one another in a direction substantially transverse to the direction of elongation of said blade, the apertures of one of said rows being offset relative to the apertures of the adjacent row in the direction of said blade, the apertures of said one row being spaced from one another in the direction of elongation of said blade cutter for a first distance, each of the apertures of said adjacent row is shaped from the respective apertures of said one row in the direction of elongation of the blade for a distance equal to substantially half of said first distance.

14. A fruit knife, comprising a handle; and an elongated blade connected with said handle and having a plurality of throughgoing apertures permitting the juice produced during movement of the blade through the fruit to flow through said apertures and thereby preventing spurting of the juice, said apertures being spaced from one another in the direction of elongation of said blade and arranged in rows which are spaced from one another in a direction substantially transverse to the direction of elongation of said blade, said blade having a first end portion connected with said handle and a second end portion spaced from said first end portion in the direction of elongation of said blade, said first end portion having a dimension in a direction transverse to the direction of elongation of said blade which exceeds the respective dimension of said second portion, said second end portion having a pointed end and a transverse cross-section decreasing in the direction towards said pointed end.

15. A fruit knife, comprising a handle; and an elongated blade connected with said handle and having a plurality of throughgoing apertures permitting the juice produced during movement of the blade through the fruit to flow through said apertures and thereby preventing spurting of the juice, said apertures being spaced from one another in the direction of elongation of said blade and arranged in rows which are spaced from one another in a direction substantially transverse to the direction of elongation of said blade, said blade having a first end portion connected with said handle and a second end portion spaced from said first end portion in the direction of elongation of said blade, said first end portion having a dimension in a direction transverse to the direction of elongation of said blade which exceeds the respective dimension of said second portion, said first portion of said blade being provided with two rows of said apertures, said second portion of said blade being provided with one row of said apertures.

16. The fruit knife as defined in claim 15, wherein said apertures are arranged in rows spaced from one another in said transverse direction at the distance decreasing in the direction towards said pointed end.

17. A fruit knife, comprising a handle; and an elongated blade connected with said handle and having a plurality of throughgoing apertures permitting the juice produced during movement of the blade through the fruit to flow through said apertures and thereby preventing spurting of the juice, said apertures being spaced from one another in the direction of elongation of said blade and arranged in rows which are spaced from one another in a direction substantially transverse to the direction of elongation of said blade, said blade having a first end portion connected with said handle, a second end portion spaced from said first end portion in the direction of elongation of said blade and having a forked end, and a third spoon-like portion located intermediate said first end portion and said second end portion.

18. The fruit knife as defined in claim 17, wherein said intermediate third portion has two end sections spaced from one another in the direction of elongation of said blade and merging into said first end portion and into said second end portion, respectively.

19. The fruit knife as defined in claim 17, wherein said intermediate third portion is concave.

20. The fruit knife as defined in claim 17, wherein said intermediate third portion is flat.

21. The fruit knife as defined in claim 17, wherein said intermediate third portion is solid.

22. The fruit knife as defined in claim 17, wherein said intermediate third portion has two convex lateral sides spaced from one another in a direction transverse to the direction of elongation of said blade.

* * * * *